United States Patent [19]

Goto

[11] 3,768,514
[45] Oct. 30, 1973

[54] VALVE STRUCTURE
[75] Inventor: Kazuhiro Goto, London, Ontario, Canada
[73] Assignee: GSW Appliances Limited, Weston, Ontario, Canada
[22] Filed: June 23, 1972
[21] Appl. No.: 265,430

Related U.S. Application Data
[63] Continuation-in-part of Ser. No. 91,878, Nov. 23, 1970.

[52] U.S. Cl. .................................. 137/609, 251/191
[51] Int. Cl. ............................................ F16k 11/14
[58] Field of Search ............................ 137/609, 608; 251/182, 189, 190, 191

[56] References Cited
UNITED STATES PATENTS

| | | | |
|---|---|---|---|
| 3,447,569 | 6/1969 | Kreuter | 251/189 X |
| 3,468,339 | 9/1969 | Gray | 251/191 X |
| 2,969,811 | 1/1961 | Freeman | 137/609 X |
| 3,075,551 | 1/1963 | Smith et al. | 137/609 |
| 3,095,904 | 7/1963 | Thaning | 251/191 X |
| 3,473,555 | 10/1969 | Martin et al. | 251/189 X |
| 3,612,479 | 10/1971 | Smith, Jr. | 251/189 X |
| 3,688,798 | 9/1972 | Nightingale et al. | 251/189 X |

Primary Examiner—Samuel Scott
Attorney—Douglas S. Johnson

[57] ABSTRACT

A valve comprising a cylindrical valve chamber, having an inlet leading into said chamber, and at least one outlet leading from said chamber and out of axial alignment with said inlet to provide a cylindrical chamber wall portion therebetween. Disposed coaxially within the chamber is at least one accordian-like resilient valve member adapted on longitudinal contraction to fold and expand radially outwardly into engagement with the cylindrical chamber wall portion to effect a seal between the inlet and the outlet and on longitudinal expansion to unfold and contract radially inwardly out of engagement with the cylindrical chamber wall portion to provide a flow passage therearound between the inlet and the outlet, and means are provided for operating the valve member.

25 Claims, 9 Drawing Figures

VALVE STRUCTURE

CROSS REFERENCE TO OTHER APPLICATIONS

This application is a continuation-in-part of U.S. Pat. application Ser. No. 91,878, filed Nov. 23, 1970.

FIELD OF THE INVENTION

This invention relates to improvements in valves of the type wherein actuation of the valve means within the valve chamber is effected by an operator controlled from outside the valve chamber. While valves embodying the invention have many applications, a particular beneficial application of the invention is to diverter valves which are used in automatic washing machines to direct suds water either to waste or into a suds saver tank, and provides the means for returning suds water to the machine for re-use.

BACKGROUND OF THE INVENTION

One of the serious problems encountered when a valve member which operates in the interior of a valve chamber is controlled by means exterior of the chamber is to provide a connection between the internal and external components without giving rise to leakage and without requiring a disproportionate amount of force to actuate the valve member as a result of the sealing arrangements required in association with the internal to exterior connection to prevent or mimimize leakage. Again, where the valve is to be used for such applications as a diverter valve for an automatic washing machine it is a serious problem to prevent the internal valve parts from accumulating lint which can result in flow stoppage or valve malfunction. In the same vein it is also difficult to provide a valve which will not readily become blocked by foreign articles such as matches, buttons, pins, coins, etc. commonly left in or become detached from garments.

The valve herein described completely eliminates the problems of obtaining an effective seal in association with the connector between the internal movable valve member and the external operating mechanism in a manner to greatly reduce the force required to operate the moving valve member. Further the valve construction is such as to lend itself to its application to a diverter valve for a washing machine to eliminate or minimize the main objectionable characteristics of diverter valves.

SUMMARY OF THE INVENTION

The present invention resides in the provision of a novel valve arrangement wherein flow through a passage or valve chamber is controlled by means of a valve employing at least one resilient accordian-like valve member or element which on being longitudinally contracted or compressed folds in a manner to expand it radially outwardly into sealing engagement with the surrounding chamber or passage to shut off flow therepast and on being longitudinally expanded or pulled apart unfolds to open the chamber or passage for flow therepast, and a longitudinally movable operator for actuating the accordian-like valve member from outside the passage or chamber is provided, the operator being secured internally within the accordian-like valve member and being isolated thereby from the interior of the passage or chamber to eliminate the necessity of a seal along its path of travel.

According to the invention one end of the accordian-like valve member or section is held fixed and the other end is moved towards and from the fixed end to provide the folding and unfolding valve action, and according to one preferred embodiment of the invention a futher or second valve member or element is tied to the movement of the movable end of the accordian-like valve member to effect opening of a flow passage when the accordian-like valve member or element is contracted longitudinally and and expanded radially and to effect closure of a flow passage when the accordian-like valve member or element is expanded longitudinally and contracted radially.

In this connection according to such preferred embodiment of the invention the valve comprises a diverter valve comprising a valve chamber or passage having an inlet passage leading thereto and a pair of outlet passages leading therefrom, the outlet passages being offset on opposite sides of the axis of the inlet passage, the accordian-like valve member or section being located so that on radial expansion it seals the valve chamber or passage at a point between the axis of said inlet passage and one of the outlet passages, and the further or second valve member is located so that on closure it seals the valve chamber or passage at a point between the axis of said inlet passage and the other of the outlet passages. The second valve member or section may either comprise an accordian-like valve member operating in the manner of the first mentioned valve member, or it may comprise a valve member movable into and out of engagement with a fixed valve seat.

According further to the preferred embodiment of the invention, the valve operator comprises an axially slidable member having an over center spring mechanism associated there-with arranged to pass over center at a point intermediate valve open and valve closed positions to aid in final valve opening and closing.

These and other features and advantages will be apparent from the detailed description of the invention hereinafter set forth.

BRIEF DESCRIPTION OF THE DRAWINGS

The invention will be described in relation to the accompanying drawings in which.

DETAILED DESCRIPTION OF THE INVENTION

Figure 1:
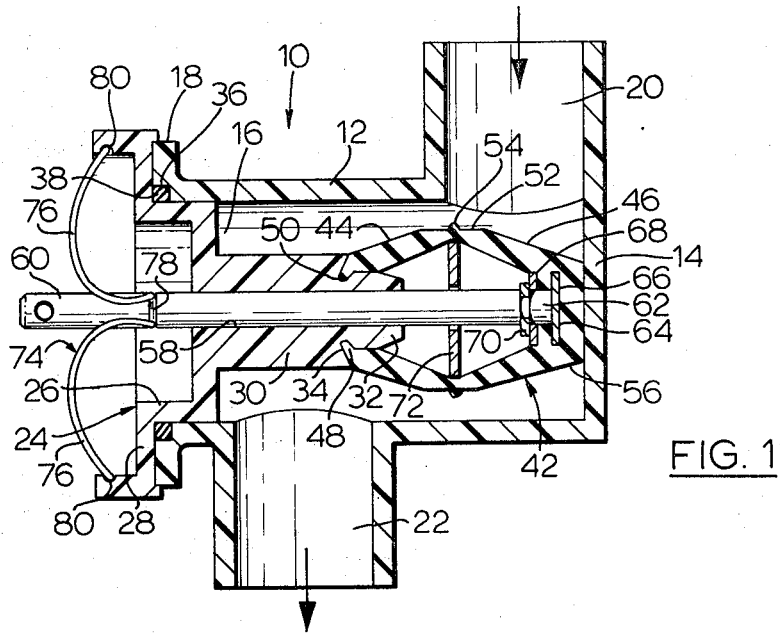
FIG. 1 is a longitudinal mid vertical cross sectional view of a simple valve constructed to embody the invention and showing the operating valve member in its valve open position.
Figure 2:
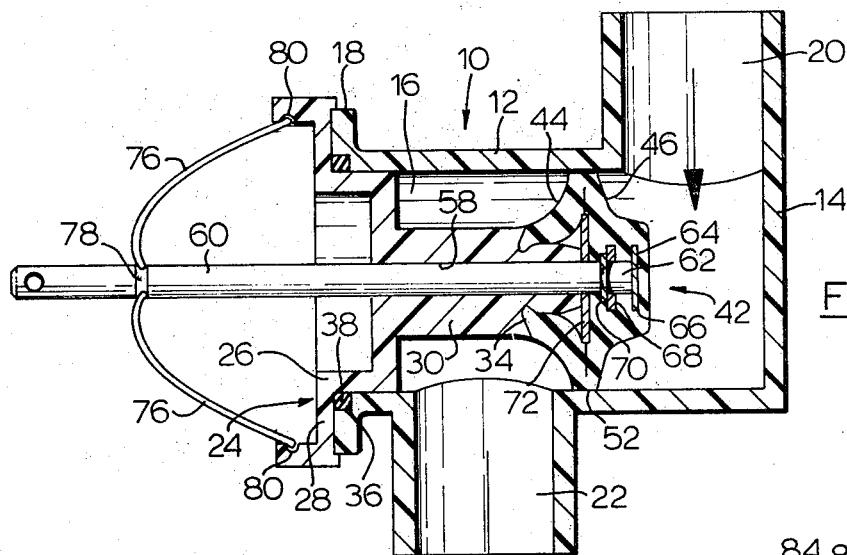
FIG. 2 is a view similar to FIG. 1 but showing the valve in the closed position.

With reference first to FIGS. 1 and 2, there is shown a valve chamber, which may be made of rigid plastic or other suitable material generally denoted by the numeral 10, the chamber being defined by a cylindrical wall 12 having a closed end wall 14 and an open end 16, provided with an outwardly extending flange 18. Leading into the chamber adjacent the end 14 is an inlet port 20 while leading from the chamber adjacent the open end 16 is an outlet port 22 axially offset from the inlet port 20. Closing the open end 16 is an end closure generally designated at 24 having an axially extending annular flange 26 engaging the interior of the wall 12 and on outwardly extending annular flange 28 abutting the flange 18. Projecting axially inwardly from the end closure 24 is a sleeve 30 terminating in a reduced nose section 32, said nose section having a slightly undercut groove 34 formed therein at its juncture with the sleeve 30.

The valve chamber flange 18 is provided with an annular notch 36 at its inner diameter to receive an O ring 38 to be compressed therein by the corner of the end closure 24 defined by the flanges 26 and 28 to provide a liquid tight seal between the end closure and interior of the valve chamber when the closure is secured in position as by means of suitable clamps 40.

A valve member generally designated at 42 and formed of a suitable resilient material such as rubber, neoprene, vinyl or the like is mounted on the end of the inwardly projecting sleeve 30 of the end closure and comprises a first tubular segment 44 and a second tubular segment 46. The first segment 44 is provided with a reduced outer end 48 adapted to seat on the nose section of the closure member sleeve 30 and includes an inwardly projecting flange 50 adapted to be received in and interlock with the groove 34 to provide a liquid tight seal therewith. From the reduced outer end 48 the tubular valve segment 44 diverges conically outwardly towards a generally annular central portion 52 of the valve member 42 which preferably has a slightly thinner wall section and is provided with an exterior bead 54 running around the periphery thereof.

The second valve segment 46 is of a shape generally corresponding to the first segment but having a closed outer reduced end 56. From the outer end 56 the valve segment 46 diverges conically outwardly towards the central portion 52 of the valve member 42. The valve member is preferably molded as a single piece and has an inherent resilience urging it to return to its unrestrained configuration as illustrated in FIG. 1.

The sleeve 30 is provided with a bore 58 therethrough adapted to slidably receive a valve operator 60 in the form of a spindle or rod. The rod 60 extends into a blind bore 62 in the closed end of the second valve segment 46 and is provided with a flange 64 formed at its inner end adapted to engage in an internal groove 66 formed at the end of the blind bore 62. A plate 68 anchored on the shaft 60 by a clip 70 locks the flange 64 in the groove 66. A plate or washer 72 slidable on the shaft 60 and of a diameter approximately equal to the inner diameter of the central portion 52 is arranged within the valve member at the central portion 52 to prevent inward collapse of this central portion beyond its essentially unstressed configuration of FIG. 1 when the valve is open and to guide the folding of the valve segments 44 and 46 to ensure that valve moves radially outwardly when folded and does not buckle axially.

In the operation of the valve it will be appreciated that as the shaft 60 is drawn to the left from its position of FIG. 1, the second valve member segment 46 will be drawn towards the first valve member segment 44 and the segments will fold together due to their conical configurations to push the central portion 52 of the valve member radially outwardly to urge same and the sealing bead 54 into sealing engagement with the interior of the cylindrical wall 12 of the valve chamber 10. It will be apparent that the more that the valve segments are folded or collapsed together the greater will be the radial displacement of their juncture 52 and the sealing bead 54 carried thereby and the tighter will be the seal with the interior of the wall 12 until the plate 72 reaches its limit position against the abutment formed by the end of the reduced nose 32 of the sleeve 30.

As will be seen from FIG. 2, the point of sealing engagement of the valve member 42 with the wall 12 is between the axially displaced inlet and outlet ports 20 and 22 respectively and liquid flow which normally takes place between these ports when the valve is unrestrained or open is effectively cut off.

To open the valve the rod or spindle 60 is moved back to the right to move the valve member 42 to the position of FIG. 1 allowing communication between the ports 20 and 22 around the valve member. Flow through the valve chamber 10 at this time will act to flush off the relatively smooth exterior surface of the valve member maintaining it clean and free of any accumulations which, if they tend to occur, are continuously broken up by the repeated flexing of the valve member.

The action of the valve segments 44 and 46 may be likened to the action of the pleats of an accordian functioning on longitudinal compression or contraction of the valve member 42 to fold together and expand radially outwardly and on longitudinal expansion or extension of the valve member 42 to expand longitudinally and contract radially.

It will be noted that the seal between the outer end of the valve member segment 44 and the nose 32 will be fully maintained for all positions of the valve member and the operator or shaft 60 is fully isolated from the interior of the valve chamber 10. As a result the shaft can have a loose sliding fit in the bore 58 and does not have to pass through any seals which would greatly increase the frictional forces to be overcome in operating the valve and as a result the valve can be operated with relatively little force usually by a small solenoid (not shown).

To assist in the valve movement and to further reduce the operating force required there is preferably provided an over center or toggle spring mechanism generally designated at 74 acting on the valve shaft 60 to assist in moving the valve to the fully closed and fully opened positions. The over centre spring mechanism illustrated in FIGS. 1 to 3 comprises a pair of generally rectangular wire frames 76 of spring steel or the like each bent into an arched configuration and having one side nesting in a groove 78 formed in the shaft 60 and the other side anchored beneath or undercut ledge 80 formed on the outwardly extending flange 28 of the end closure 24.

Figure 3:
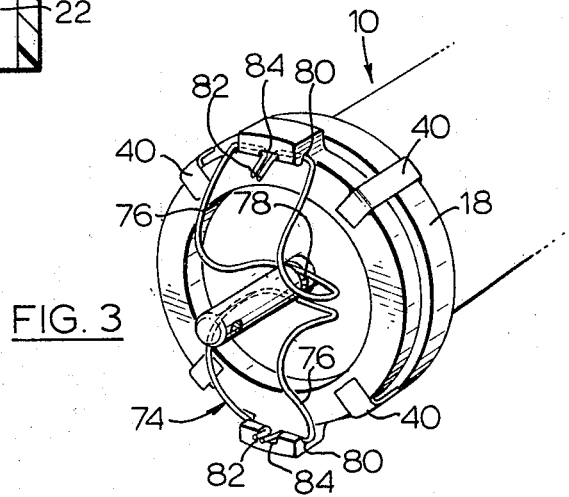
FIG. 3 is a perspective view illustrating the over center spring operator.

As illustrated in FIG. 3 the wire frames 76 are are not closed but have the wire ends 82 inturned with respect to the frames and projecting outwardly through slots 84 in the ledges 80 to lock the frames from spreading, the whole providing a very simple and simply mounted over center mechanism.

Figure 4:
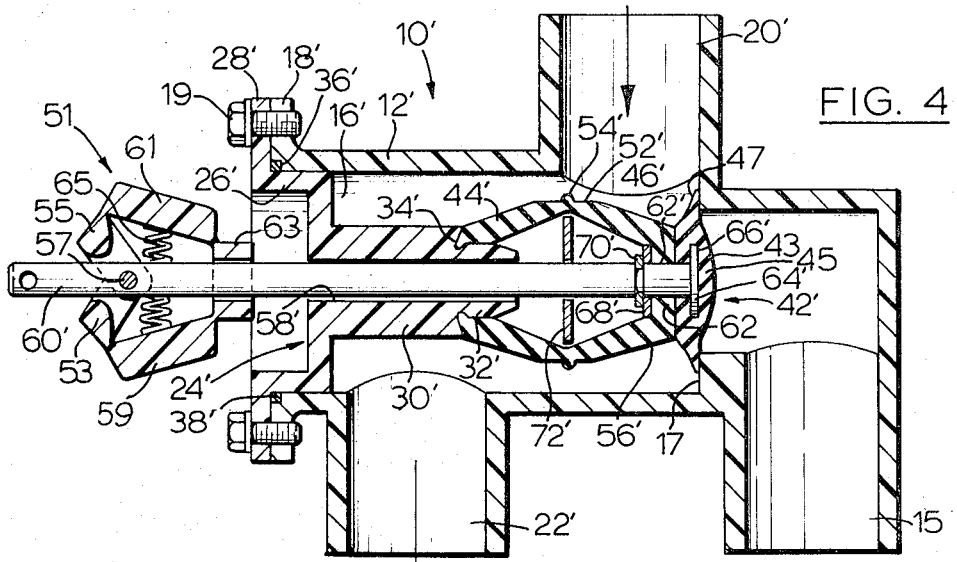
FIG. 4 is a longitudinal mid vertical sectional view of another embodiment of the invention applied to a diverter valve and illustrating the valve in position to direct the inlet flow to the left hand outlet.
Figure 5:
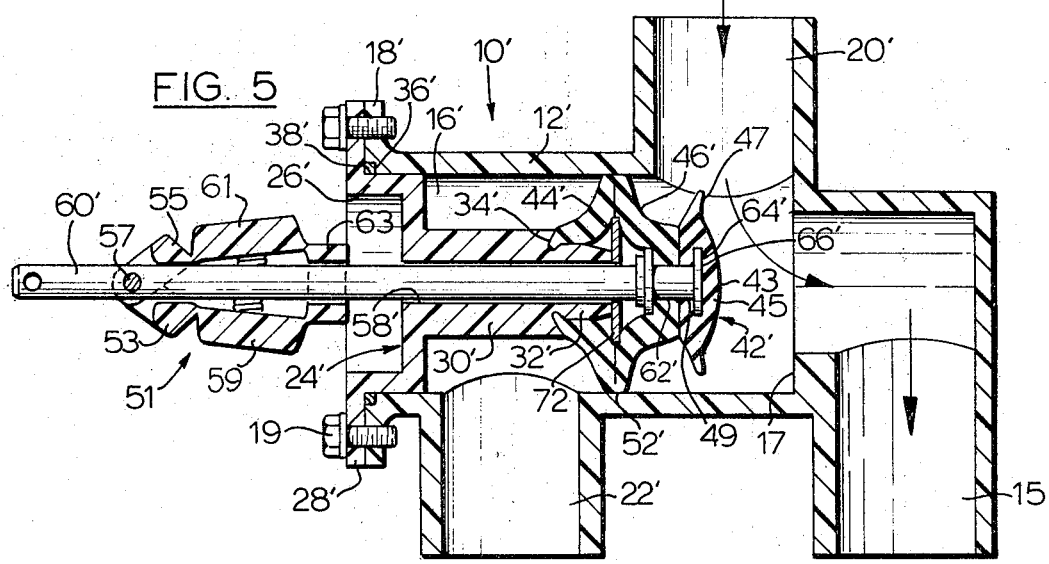
FIG. 5 is a view similar to FIG. 4 but showing the valve actuated to direct inlet flow to the right hand outlet.
Figure 6:
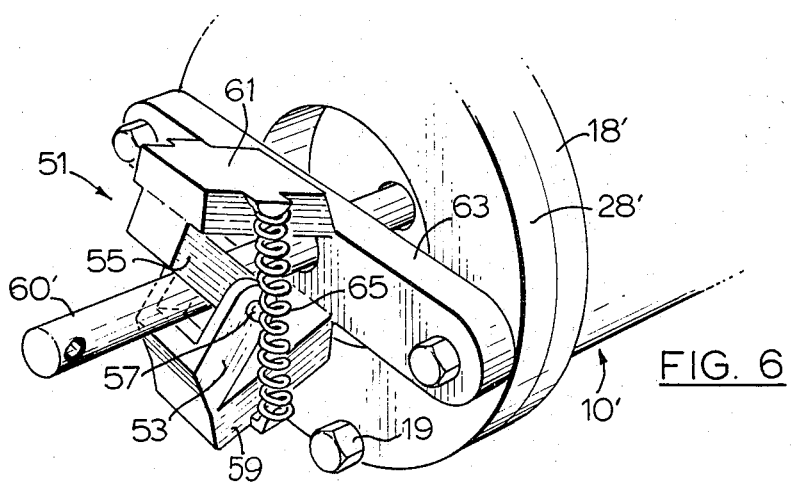
FIG. 6 is an enlarged perspective view of a toggle mechanism which can be used to assist the reciprocal movement of the valve.

FIGS. 4, 5 and 6 illustrate the application of the invention to a diverter valve which comprises a valve chamber 10' having a cylindrical wall 12', terminating in an open end 16' provided with an outwardly extending mounting flange 18'. The opposite end of the chamber 10' instead of being closed communicates with an outlet 15 defining a valve seat 17, the outlet 15 being out of axial alignment with the inlet port 20' and an outlet port 22' corresponding to the inlet and outlet ports 20 and 22 respectively of the valve illustrated in FIGS. 1 and 2.

The open end 16' of the valve chamber 10' is provided with an end closure 24' having an axially extending annular flange 26' and an outwardly extending annular flange 28' adapted to abut the flange 18' and being secured thereto by suitable bolts 19.

As before the closure 24' is provided with a sleeve 30' having a reduced nose portion 32' formed with an undercut groove 34' at its juncture with the sleeve 30' A positive seal is provided between the end closure 24' and the valve chamber 10' by means of an O-ring 38' seating in a notch 36' formed in the flange 28'.

As before the valve member 42' is constructed to act like the pleat of an accordian and comprises a first valve segment 44' and a second valve segment 46', the first valve segment having a flange 50' to interfit in the undercut groove 34' and diverging conically outwardly to a central generally annular portion 52' preferably provided with a peripheral bead 54'. The second valve segment 46' has a reduced outer end 56' provided with a bore 62' therethrough and diverges conically outwardly from the outer end towards the central portion 52'. A valve operator in the form of a slidable rod 60' is slidably received in a bore 58' formed in the sleeve 30' which again acts as a guide but is not required to provide a seal around the rod.

As before the valve member 42' is of rubber like material and has inherent resiliency urging it to the configuration illustrated in FIG. 4. Mounted on the outer end 56' of the second valve segment 46' is a second disc like valve member 43 of a suitable resilient material such as rubber, neoprene, vinyl or the like having a relatively thick and stiff central portion 45 and a relatively thinner and more flexible outwardly facing rim portion 47.

The rod 60' extends through the bore 58' and is provided with a flange 64' which is received in an internal groove 66' formed in the valve member 43 at the end of a blind bore 49. The valve 43 is clamped to the end of the second valve segment 46' of the first valve member 42' to provide a liquid seal therebetween by means of the clamp afforded by the flange 64' and a locking plate 68' engaging the interior of the valve segment 46' and held in place by a clip 70'.

Again a slidable washer or plate 72' within the valve member 42' limits inward collapse of the valve member, guides the folding action of same, and limits axial displacement of the central portion 52' (and axial compression of the valve 42') by engagement with the nose 32'.

The valve arrangement of the embodiment of the invention as shown in FIGS. 4 and 5 is such that with the valve rod or operator 60' moved fully to the right, as illustrated in FIG. 4, the disc valve 43 seats on the valve seat 17 closing outlet 15 and communication is established between the inlet port 20' and the outlet port 22' around the valve member 42'. When the valve rod 60' is operated to the left as by means of a solenoid, not shown, the valve member 43 will be lifted clear of its seat and the valve member 42' will be contracted or collapsed axially and will be folded like an accordian pleat to expand radially, as illustrated in FIG. 5, to seal off communication with outlet port 22' and flow will take place between ports 20' and 15.

Again because the valve operator 60' is isolated from the interior of the chamber 10' and does not have to pass through a tight liquid seal, the force required for its axial movement is minimized. Moreover not only does the flexing of the valve member 42' prevent the accumulation of material thereon, the flexibility of the rim portion 47 of the valve 43 ensures that an accumulation thereon can be readily dislodged and at the same time an intimate seal can be obtained between this rim portion and the valve seat 17.

A valve structure such as illustrated in FIGS. 4 and 5 is particularly applicable as a diverter valve for an automatic washing machine wherein it is frequently desired to provide the option of discharging the suds containing liquid in the machine either to a waste drain or to a suds saving tank from which the liquid may be subsequently withdrawn back into the machine for a further work cycle.

In this connection, the normal position of the valve is to connect ports 20' and 22' to deliver the liquid being discharged from the machine to a waste drain with the valve member 42' in the unrestrained or open position to preclude any possibility of it taking a permanent set even over an extended operating life, and the valve 43 which is a simple seating valve, is in the closed position. For suds saving the valve mechanism may be operated to connect ports 20' and 15 with port 15 connected to a suds saving tank, the port 20' forming the outlet port during the suds containing liquids discharge from the tank. To recover the suds containing liquid it will be appreciated that the machine pumps will be reversed and the liquid will be pumped in a direction to render the port 15 as the inlet port and the port 20' as the outlet port. It will therefore be appreciated that when the ports described in relationship to the valve structures of this invention are described as inlet or outlet, their functions may be reversed upon reversal of the direction of liquid flow.

As before, an assist may be provided for movement of the valve operator or rod in the form of an over center mechanism in the form of a spring actuated toggle mechanism generally designated at 51. The toggle mechanism 51 as seen in FIG. 6 consists of a first pair of arms 53 and 55 which are pivotably secured to the rod 60' adjacent the end thereof by means of a pin 57. The arms 53 and 55 are pivoted respectively to second arms 59 and 61 extending towards the end closure 24' which seals one end of the valve chamber 10'. These arms 59 and 61 are each pivotably secured to a cross piece 63, the cross piece 63 being secured to the closure 24'. The arms 59 and 61 are held together by springs 65. It will be observed from FIGS. 4 and 5 that the toggle mechanism 51 simply provides a snap-over center movement of the rod 60' when the pin 57 passes through the plane in which the arms 53 and 55 are pivoted to the arms 59 and 61. It has been found that the toggle mechanism 51 involving pivoting of the arms 53, 55, 59 and 61 described above may be made of plastic, the pivots being formed as shown by reduced portions. It will be appreciated that the toggle mechanism 51 is not essential to the operation of the valve and other means to facilitate activation may be employed.

Figure 7:
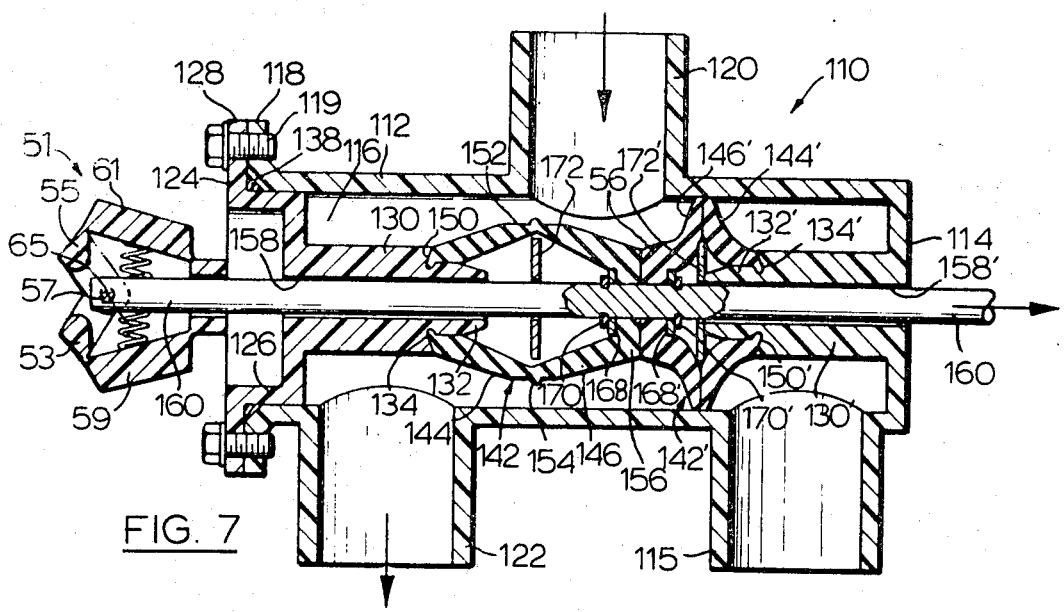
FIG. 7 is a longitudinal mid vertical sectional view of an alternate form of diverter valve embodying the invention and showing the valve in a position to direct the inlet flow to the left hand outlet.
Figure 8:
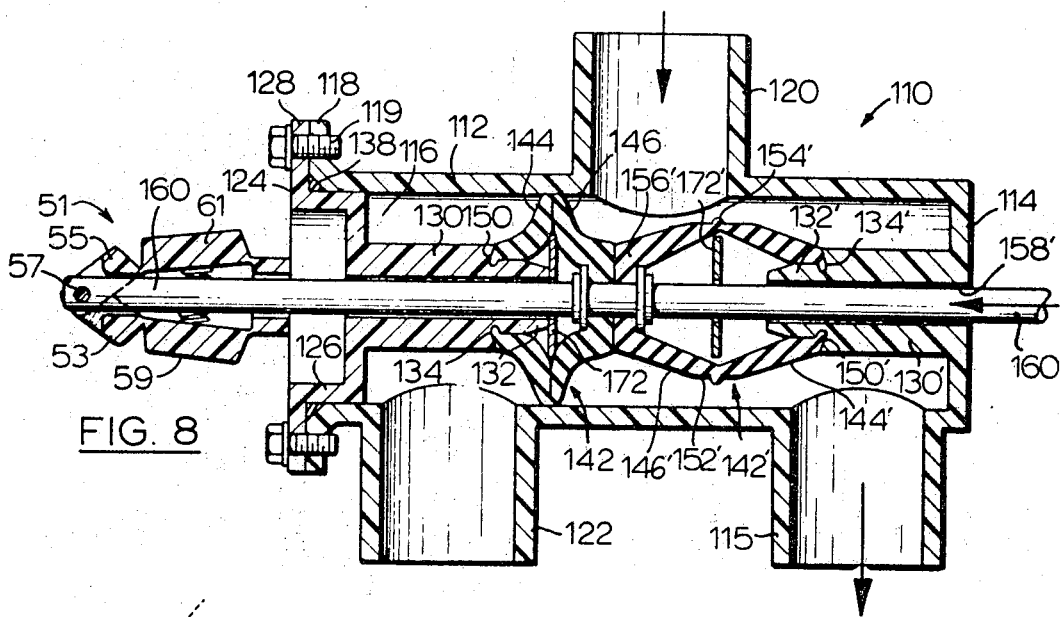
FIG. 8 is a view similar to FIG. 7 but showing the valve operated to direct inlet flow to the right hand outlet.
Figure 9:
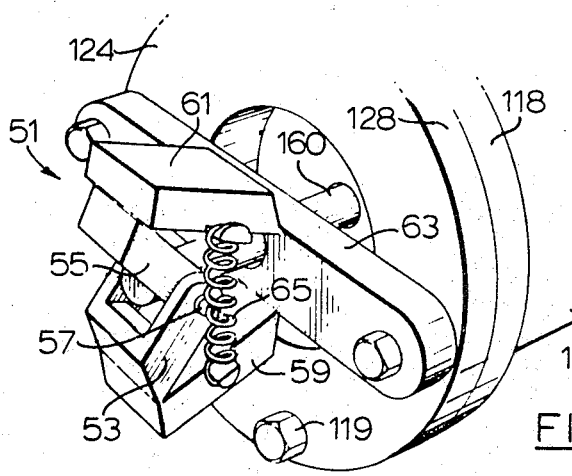
FIG. 9 is a view similar to FIG. 6 of the toggle mechanism associated with the valve of FIGS. 7 and 8.

With reference to FIGS. 7 to 9, the application of the invention to an alternative form of diverter valve is illustrated. In this connection, the valve chamber is generally designated at 110 and presents a cylindrical wall 112. One end of the chamber is closed as at 114 while the other end 116 is open, and is provided with an outwardly extending mounting flange 118. Leading into the valve chamber 110 is an inlet port 120, a first outlet port 115 and a second outlet port 122. Closing the open end 116 of the valve chamber is an end closure 124 having an axially extending annular flange 126 terminating in an outwardly extending flange 128 adapted to abut the flange 118. The end closure member is bolted in position with bolts 119. Extending axially inwardly from the end closure 124 is a sleeve 130 having a reduced nose portion 132 provided with an undercut groove 134. An O-ring 138 compressed between the flanges 128 and 118 provides a liquid tight seal at the chamber end 116.

Projecting axially inwardly from the closed end 114 of the valve chamber is a sleeve 130' corresponding to the sleeve 130 in configuration and having a reduced nose portion 132' provided with an undercut groove 134'. Mounted on the nose portions 132 and 132' of the sleeves 130 and 130' are a pair of valve members 142 and 142' of identical construction and corresponding to the valve member 42 of FIGS. 1 and 2 and 42' of FIGS. 4 and 5. Since the valve members 142 and 142' are the same, one only need be described. In this connection the valve member 142 is provided with a first tubular segment 144 and a second tubular segment 146. The first segment 144 is provided with a flange 150 which seats in the groove 134 and diverges conically outwardly to an annular central portion 152 provided with an exterior bead 154. The second valve segment 146 diverges conically outwardly from an outer end portion 156 to the central annular portion 152.

The corresponding parts of the valve member 142' are designated at 144', 146', 150', 152', 154' and 156'.

The sleeve 130 is provided with a central bore 158 and similarly the sleeve 130' is provided with a central bore 158'. Slidably mounted in and guided by the bores 158 and 158' is a valve operator in the form of a slidable rod 160. This rod carries a pair of locking plates 168 and 168' disposed interiorly of the valve members 142 and 142' respectively, and acting against the interior surfaces of the outer ends 156 and 156' of the valve segments 146 and 146' respectively to clamp the ends of these segments together with a liquid tight seal and to provide an anchor to effect longitudinal movement of the valve members 142 and 142'. Alternatively, the valve members 142 and 142' may be moulded as a one piece unit and the function of the plates 168 and 168' will then simply be to anchor the central portion or juncture of the valve members to move with the valve operator 160 upon longitudinal movement thereof. The plates 168 and 168' are held in valve clamping relation by suitable clips 170 and 170'.

Preferably arranged within the valve members 142 and 142' are fold guiding washers or plages 172 and 172' which limit inward collapse of the valves so that the opposing conically diverging valve segments are always maintained in an outwardly diverging attitude towards the central portions 152 and 152' to ensure proper folding of the valve members in their accordian-like action on longitudinal movement of the rod 160. Again contact of the sliding plates 172 and 172' with the ends of the noses 132 and 132' of the sleeves limits folding action of the segments of the valve members and further assists in maintaining the fold in the same plane around the valve.

Again it will be appreciated that the valve operator 160 is isolated from the interior of the valve chamber and does not have to operate through any liquid seals which would give rise to substantial frictional resistance to longitudinal movement requiring a substantial external operating force.

As illustrated it will be appreciated from FIG. 7 that the right hand valve member 142' has been axially compressed or collapsed and thereby radially expanded by virtue of the folding together of the valve segments 144' and 146' to force the bead 154' and as well adjacent portions of the central annular valve portion 152' against the interior wall 112 to provide a seal between the inlet port 120 and the outlet port 115, the ports being axially offset to provide the wall area therebetween against which the radially expanded valve 142' seats. Flow then takes place from the inlet 120 to the outlet 122 around the valve 142.

On axial movement of the rod 160 to the left, to the position of FIG. 8, the right hand valve member 142' is longitudinally extended to unfold the segments 144' and 146' to effect radial contraction of the valve member. Simultaneously the valve member 142 is longitudinally compressed effecting a folding of the valve segments 144 and 146 to force or expand them radially outwardly to bring the bead 154 and adjoining annular portion 152 into contact with the interior of the cylindrical wall 112. Again the axes of the inlet port 120 and the outlet port 122 are offset to provide a seating wall portion between the ports 120 and 122. It will be understood that during the longitudinal telescoping and radial expansion of the one valve member and the longitudinal expansion and radial contraction of the other valve member, the ends of the valve segments 144 and 144' will be held fixed against movement in their grooves 134 and 134'.

As before, an over center mechanism may be used to assist in movement of the rod 160 and the over center mechanism disclosed in FIGS. 7, 8 and 9 is identical with that disclosed in FIGS. 4, 5 and 6 and like numbers are used to designate like parts.

Again the valve chamber 110 may be formed of a suitable rigid plastic or other rigid material as may also the end closure 124 and its associate parts and the sleeve 130'. The valve members 142 and 142' are formed of a suitable resilient material having an inherent resiliency urging them to their unrestrained shape as illustrated in FIG. 7 for valve 142 and in FIG. 8 for valve 142'.

In each of the valve constructions illustrated, it will be readily apparent that the valves can be very quickly assembled and dismantled without the use of any special tools. In addition, the construction employed is simple and inexpensive with all major components being simply moulded parts. Moreover the valve members per se comprising the members 42, 42', 43, 142 and 142' can be removed and replaced whenever necessary, simply, easily and inexpensively.

While several applications of the invention have been described, it will be understood that the invention may be applied in many different ways and the details of construction and arrangement may be varied as will be apparent to those skilled in the art, without departing from the spirit of the invention or scope of the appended claims.

I claim:

1. A valve comprising a cylindrical valve chamber, an inlet leading into said chamber, at least one outlet leading from said chamber and out of axial alignment with said inlet to provide a cylindrical chamber wall portion therebetween, at least one accordian-like resilient valve member disposed coaxially within said valve chamber, said valve member being hollow and comprising a first resilient tubular valve segment having a reduced outer end anchored against axial movement and diverging conically outwardly towards a central valve member portion and a second resilient tubular valve segment having a reduced outer end anchored to said valve operator and diverging conically outwardly toward said central valve member portion, said valve member being adapted on longitudinal contraction to fold and expand radially outwardly into engagement with said cylindrical chamber wall portion to effect a seal between said inlet and outlet and on longitudinal expansion to unfold and contract radially inwardly out of engagement with said cylindrical chamber wall portion to provide a flow passage therearound between said inlet and said outlet and means for operating said valve member.

2. A valve as claimed in claim 1 in which said valve chamber has a second cylindrical wall portion disposed on the opposite side of the axis of said inlet from said first mentioned cylindrical chamber wall portion and said second valve member comprises a second accordian-like valve member corresponding to said first mentioned accordian-like valve member adapted to be expanded radially outwardly into engagement with said second cylindrical chamber wall portion when said first valve member is contracted radially inwardly away from said first cylindrical chamber wall portion and vice versa.

3. A valve as claimed in claim 1 in which said central valve member portion is provided with a bead projection extending around the outer periphery thereof.

4. A valve as claimed in claim 1 in which said hollow valve member has an axially movable rigid plate mounted therewithin at said central portion and having a diameter substantially as great as the internal valve member diameter at said central portion.

5. A valve as claimed in claim 1 in which said valve operator comprises a slidable rod extending into the interior of said hollow valve member and isolated thereby from the interior of said chamber.

6. A valve as claimed in claim 1 in which said valve chamber is open at one end, a closure for said open chamber end, an inward projecting sleeve portion carried by said closure and disposed on the axis of said chamber, the reduced outer end of said first valve segment being anchored to and encompassing said sleeve portion to isolate the interior of said sleeve from the interior of said chamber, said sleeve providing communication from the exterior of said valve chamber to the interior of said valve member, and said valve operator comprises a rod freely slidable in said sleeve and extending through the interior of said valve member to its point of anchorage to the reduced outer end of said second valve segment.

7. A valve as claimed in claim 6 having overcenter spring mechanism acting on said slidable rod and arranged to aid rod movement to the valve open and valve closed positions.

8. A valve as claimed in claim 7 in which said overcenter spring mechanism is a spring actuated toggle mechanism.

9. A valve as claimed in claim 7 in which said spring mechanism comprises a pair of opposing arched spring wire frames having one side anchored to said valve chamber in diametrically opposed relation and the opposite sides seated in opposite sides of a groove in said rod, said frames passing through an over center position as said rod moves between valve open and valve closed positions.

10. A valve as claimed in claim 1 which said valve chamber is provided with a second outlet and disposed on the opposite side of the axis thereof from said first outlet and a second valve member is actuated by said valve operating means to open and close communication between said inlet and said second outlet when said first valve member is actuated to close and open communication between said inlet and said first outlet respectively.

11. A valve as claimed in claim 10 in which said valve chamber is provided with a coaxial reduced valve seat on the opposite side of the axis of said inlet from the axis of said first outlet and said second valve member comprises a resilient valve member adapted to be moved axially of said valve chamber against said valve seat when said first valve member is longitudinally expanded and to be withdrawn from said valve seat when said first valve member is longitudinally contracted.

12. A valve as claimed in claim 10 in which said valve chamber has a second cylindrical wall portion disposed on the opposite side of the axis of said inlet from said first mentioned cylindrical chamber wall portion and said second valve member comprises a second accordian-like valve member corresponding to said first mentioned accordian-like valve member adapted to be expanded radially outwardly into engagement with said second cylindrical chamber wall portion when said first valve member is contracted radially inwardly away from said first cylindrical chamber wall portion and vice versa.

13. A valve as claimed in claim 1 in which said valve chamber is provided with a second outlet and disposed on the opposite side of the axis thereof from said first outlet and a second valve member actuated by said valve operating means to open and close communication between said inlet and said second outlet when said first valve member is actuated to close and open communication between said inlet and said first outlet respectively.

14. A valve as claimed in claim 13 in which said valve chamber is provided with a coaxial reduced valve seat on the opposite side of the axis of said inlet from the axis of said first outlet and said second valve member comprises a resilient valve member adapted to be moved axially of said valve member against said valve seat when said first valve member is longitudinally expanded and to be withdrawn from said valve seat when said first valve member is longitudinally contracted.

15. A diverter valve comprising a cylindrical valve chamber having an inlet in the cylindrical wall thereof, first and second outlets leading from said chamber on opposite sides of the axis of said inlet, at least said first outlet leading through said cylindrical chamber wall and said chamber presenting a cylindrical wall portion between said inlet and said first outlet, said chamber being open at least at one end adjacent to said first outlet, a closure for said open chamber end having a coaxial sleeve portion projecting into said chamber, a first valve member for opening and closing flow communication between said inlet and said first outlet, comprising a first resilient tubular valve segment coaxial with said sleeve and having a reduced outer end encompassing and anchored to the inner end of said sleeve and diverging conically outwardly to a central portion and a second coaxial resilient tubular valve segment having a reduced outer end and diverging conically outwardly to said central portion and defining with said first valve segment a hollow accordian-like structure isolating the interior of said sleeve from said chamber and being adapted on contraction axially of the chamber to fold and expand radially outwardly against said cylindrical wall portion to provide a seal between said inlet and first outlet and on expansion axially of the chamber to contract radially inwardly away from said cylindrical wall portion to provide a flow passage there around, a rod freely slidably mounted in said sleeve and extending into the interior of said hollow accordian-like structure and isolated thereby from the interior of the chamber, the outer end of said second valve segment being anchored to said rod for movement therewith axially of said chamber to provide said radial valve expansion and contraction, and a second valve member connected to said rod and actuated thereby to provide a seal between said inlet and said second outlet when said first valve member is radially retracted and to provide a flow passage between said inlet and second valve member when said first valve member is radially expanded.

16. A diverter valve as claimed in claim 15 in which the central portion of said accordian-like valve structure has an external sealing bead extending peripherally therearound and a circular plate is slidably mounted on said rod within said accordian like structure and having a diameter substantially equal to the internal diameter of the central portion thereof.

17. A diverter valve as claimed in claim 16 in which said valve chamber is provided with a valve seat centered on the chamber axis on the side of the inlet axis adjacent to said second outlet, and said second valve connected to said rod comprises a resilient cylindrical valve member adapted to seat against said valve seat when said accordian-like first valve member is expanded axially of the cylinder to close off communication between said inlet and second outlet, and to be retracted from said seat when said accordian-like first valve is contracted axially to provide communication between said inlet and second outlet.

18. A diverter valve as claimed in claim 16 in which said chamber presents a second cylindrical wall portion between said inlet and said second outlet, and second valve member comprises a second accordian-like structure corresponding to said first valve member and having one end remote from said first valve member anchored against axial chamber movement and the opposite end adjacent to said first valve member anchored to said rod for axial movement therewith, the arrangement being such that with said first valve member axially contracted to seal against said first mentioned cylindrical wall portion said second valve member is axially expanded and radially retracted and with said first valve member axially expanded said second valve member is axially contracted and radially expanded to seal against said second cylindrical wall portion.

19. A diverter valve as claimed in claim 18 in which the ends of said first and second valve members fixed to said rod are secured together and said rod is isolated by said valve members from the interior of said chamber.

20. A diverter valve comprising a housing with a pair of spaced apart outlet ports and an inlet port disposed therebetween, flexible valve means disposed within said housing comprising a sleeve structure having a pair of adjoining accordian-like sections connected by a juncture portion whereby on longitudinal movement of said juncture portion in one direction one of said accordian-like sections is longitudinally contracted and radially expanded and the other of said accordian-like sections is simultaneously longitudinally expanded and radially retracted, said radially expanded section sealing against said housing at a point between said inlet port and one of said outlet ports to preclude fluid flow therebetween and said radially retracted section permitting fluid flow around said sleeve structure between said inlet port and the other of said outlet ports, and vice versa, on longitudinal movement of said juncture portion in the other direction, and means operating within said sleeve structure and isolated thereby from the interior of said housing to effect longitudinal movement of said accordian-like sections.

21. A diverter valve as claimed in claim 20 in which said means operating within said sleeve comprises a spindle projecting through and slidable longitudinally of said sleeve, and means connecting said juncture portion to said spindle.

22. A diverter valve as claimed in claim 21 wherein said housing is of generally cylindrical configuration and said accordian-like sections are circular in configuration.

23. A diverter valve as claimed in claim 22 wherein one projecting end of said spindle is pivotally connected to a toggle mechanism and the other end to an activating mechanism to drive the spindle into its respective positions.

24. A diverter valve as claimed in claim 23 wherein said juncture portion connecting said accordian-like sections presents an annular internal wall and said means attaching said spindle to said juncture portion comprises a washer located on said spindle on each side of said internal wall and bearing against same and spring clips secured to said spindle and positioned to maintain said washers in contact with said internal wall.

25. A diverter valve as claimed in claim 23 wherein a washer slidably mounted on said spindle is located within each of said accordian-like sections to limit radial retraction thereof.

* * * * *